O. W. JOHNSON.
TRACTOR.
APPLICATION FILED AUG. 10, 1915. RENEWED DEC. 14, 1918.
1,307,673.
Patented June 24, 1919.
13 SHEETS—SHEET 7.
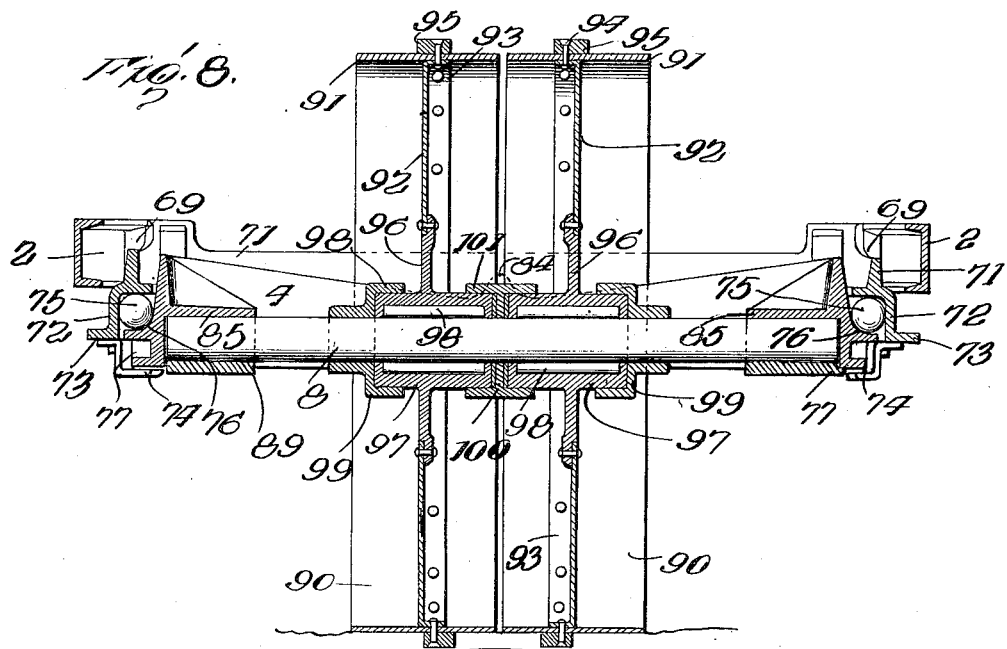
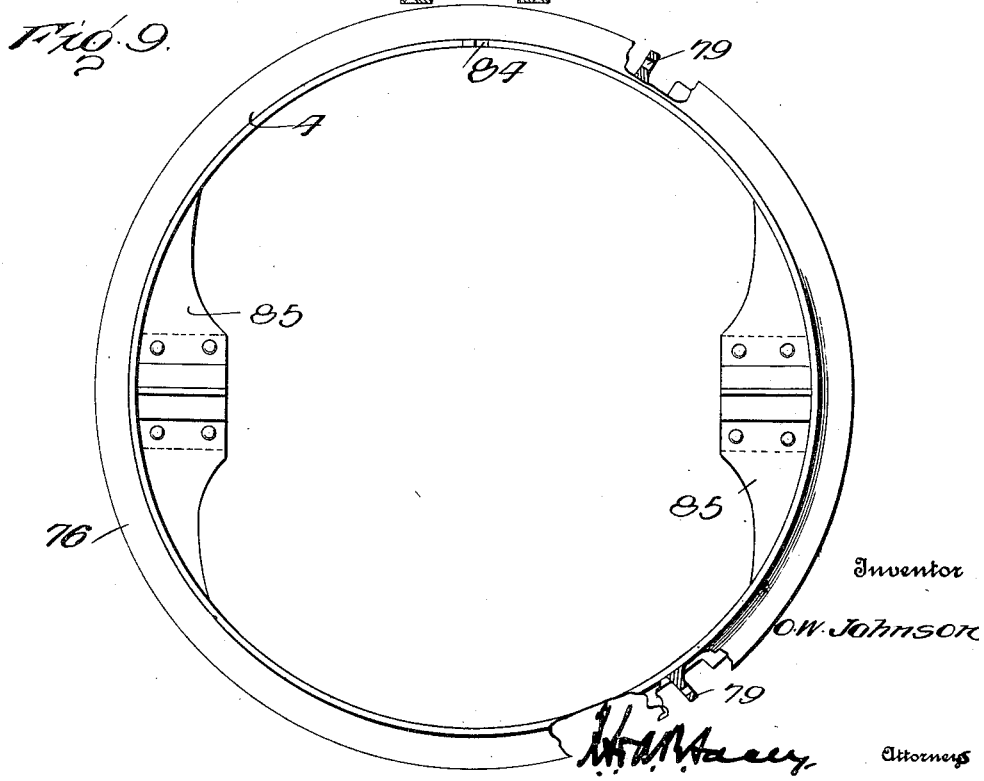
Inventor
O. W. Johnson
Attorneys

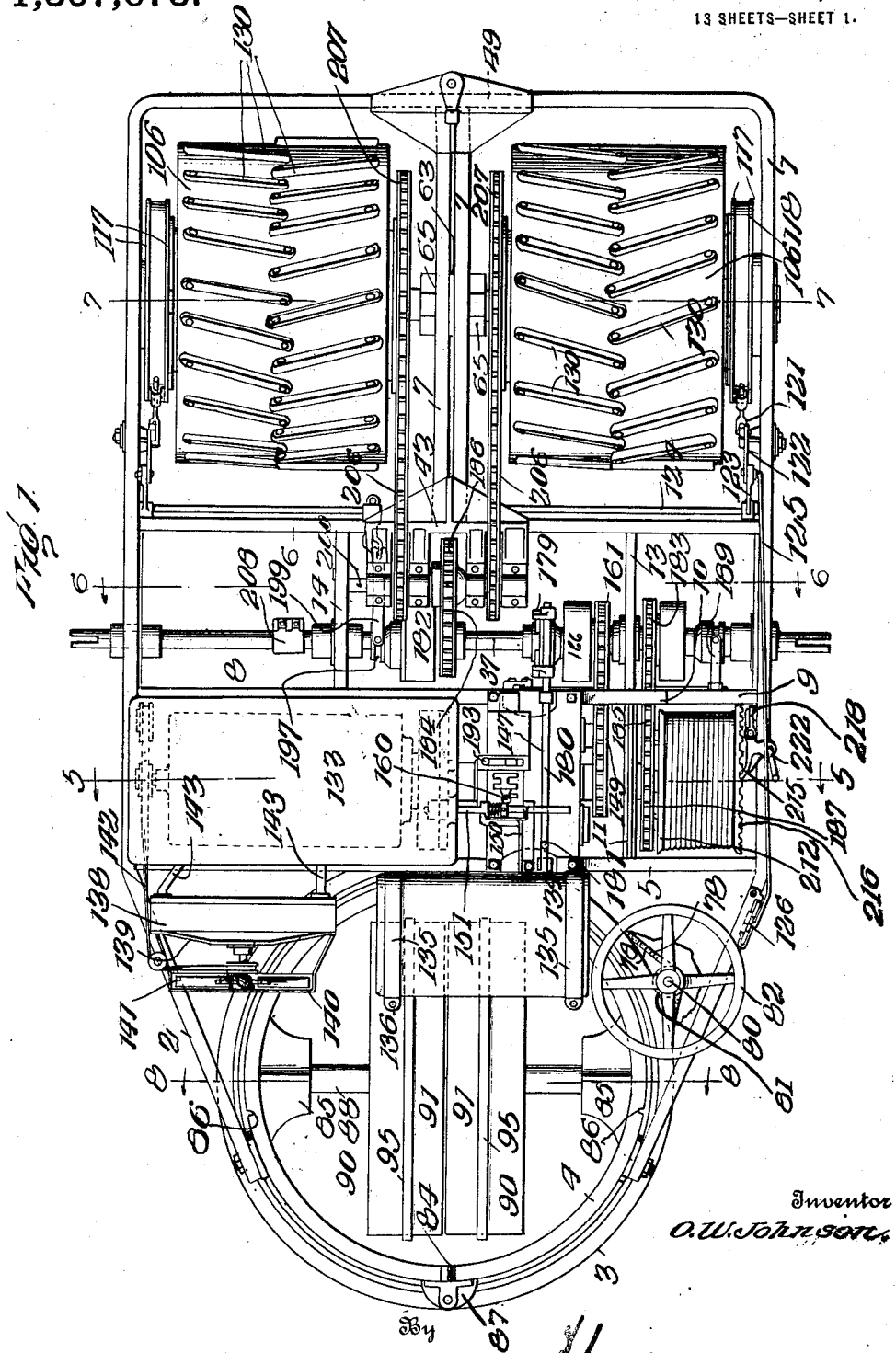

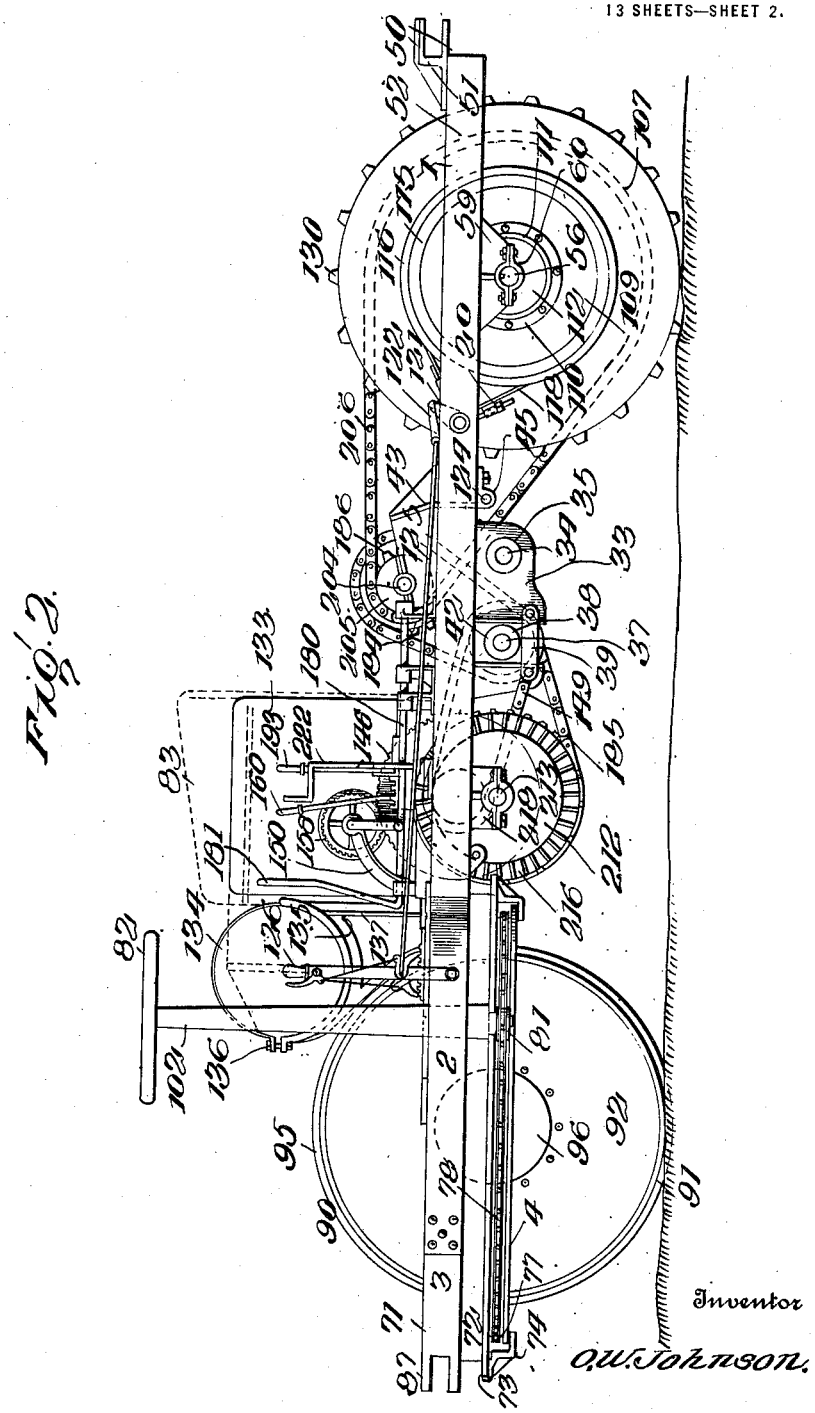

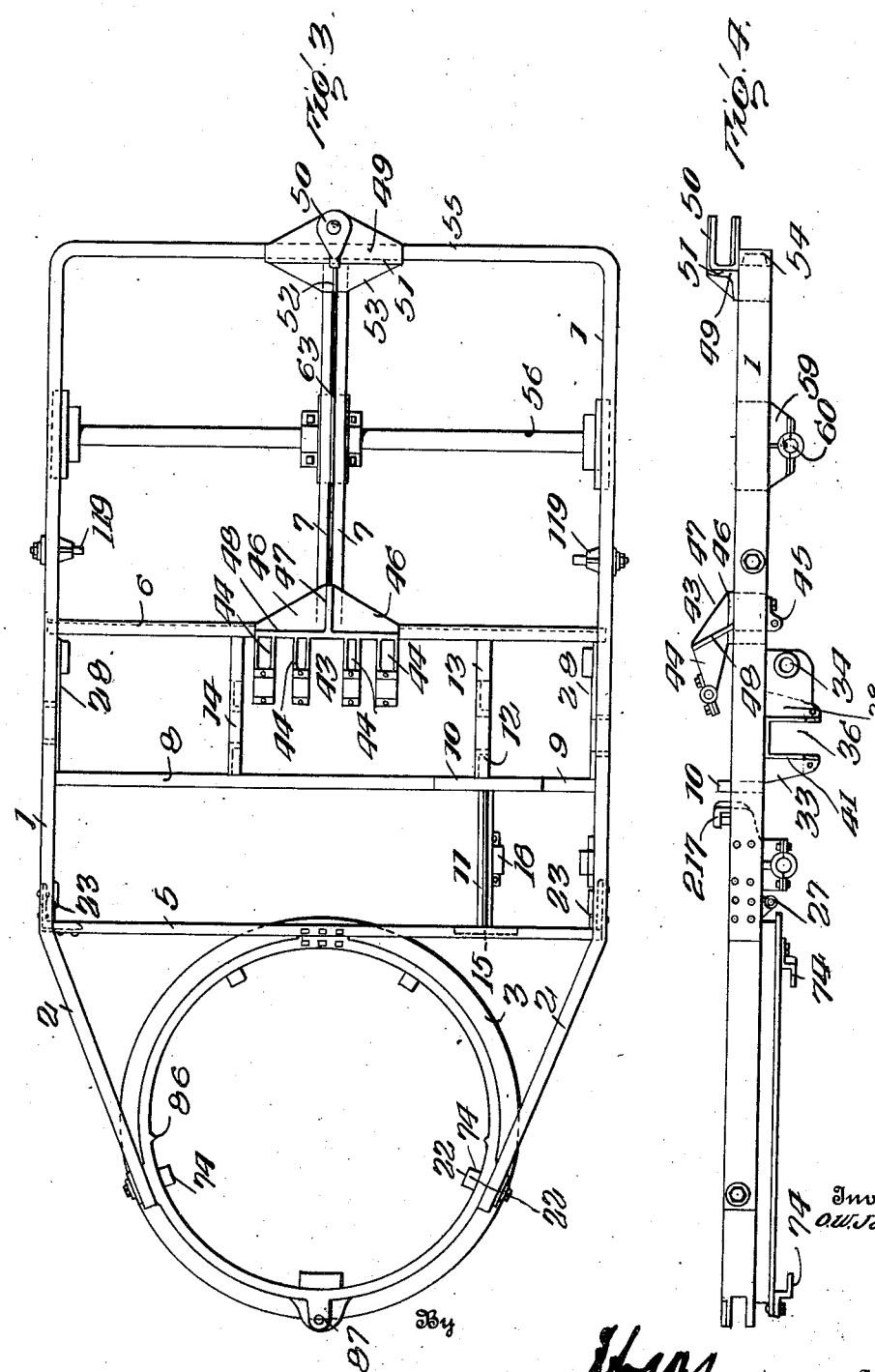

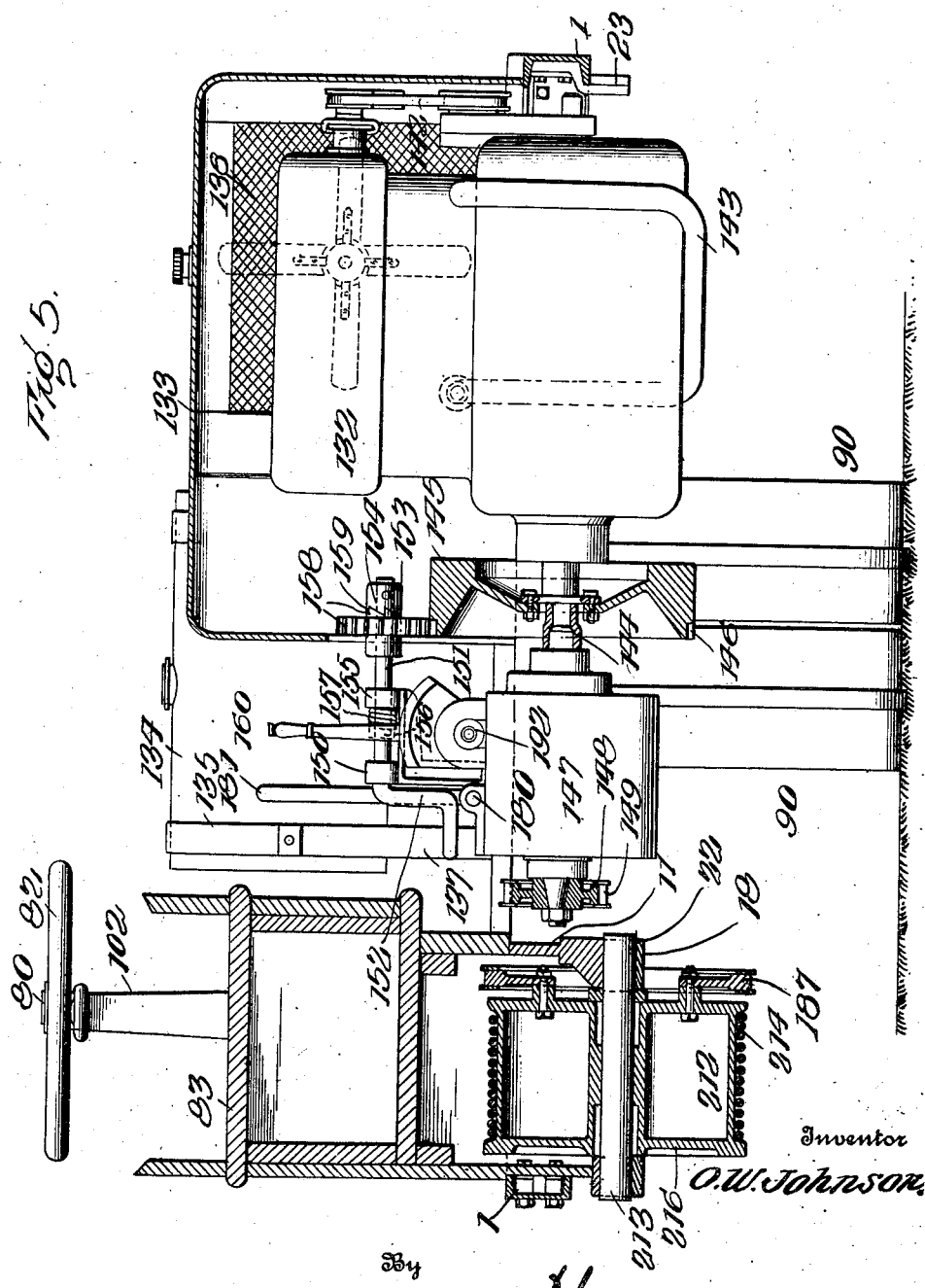

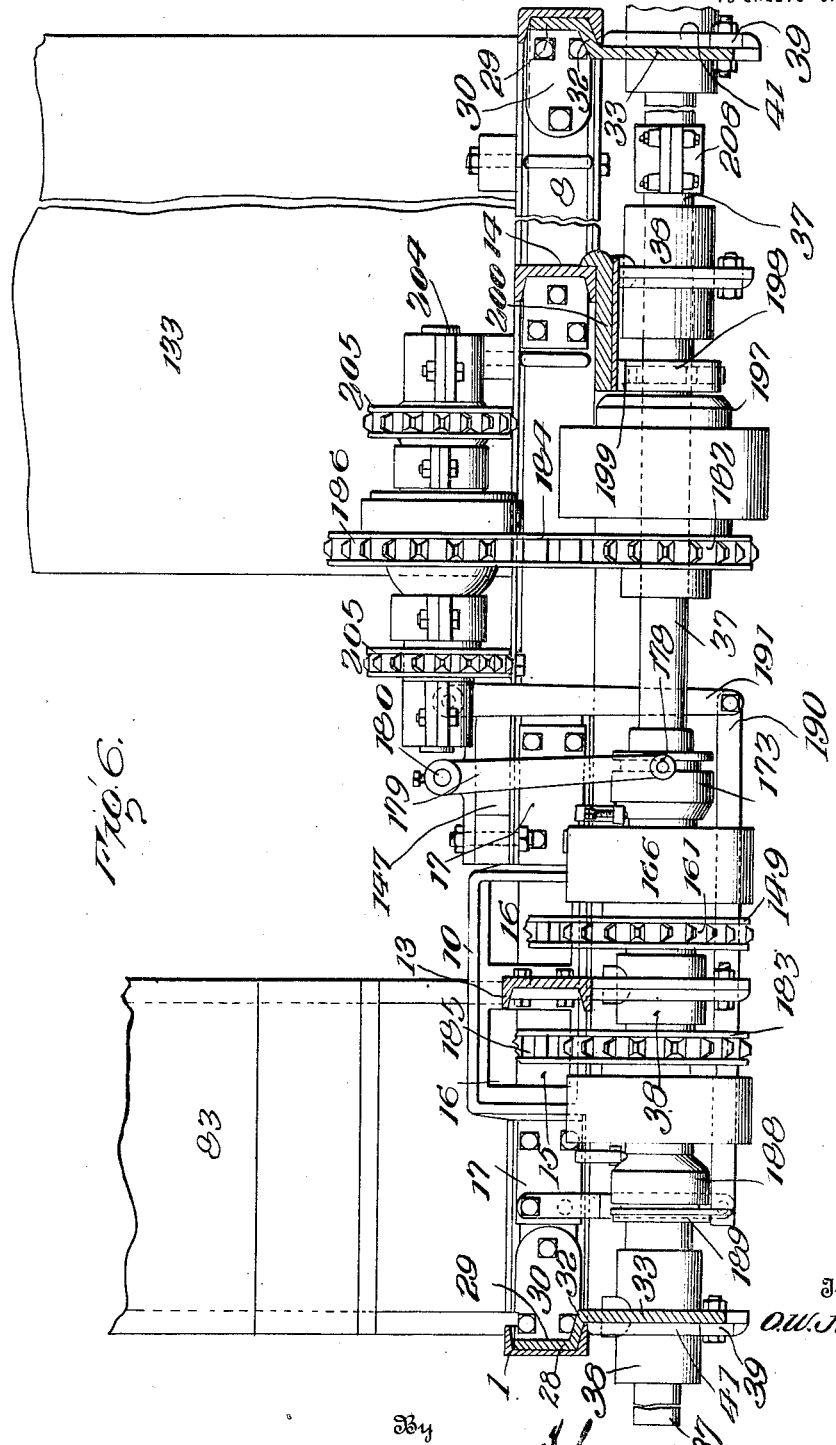

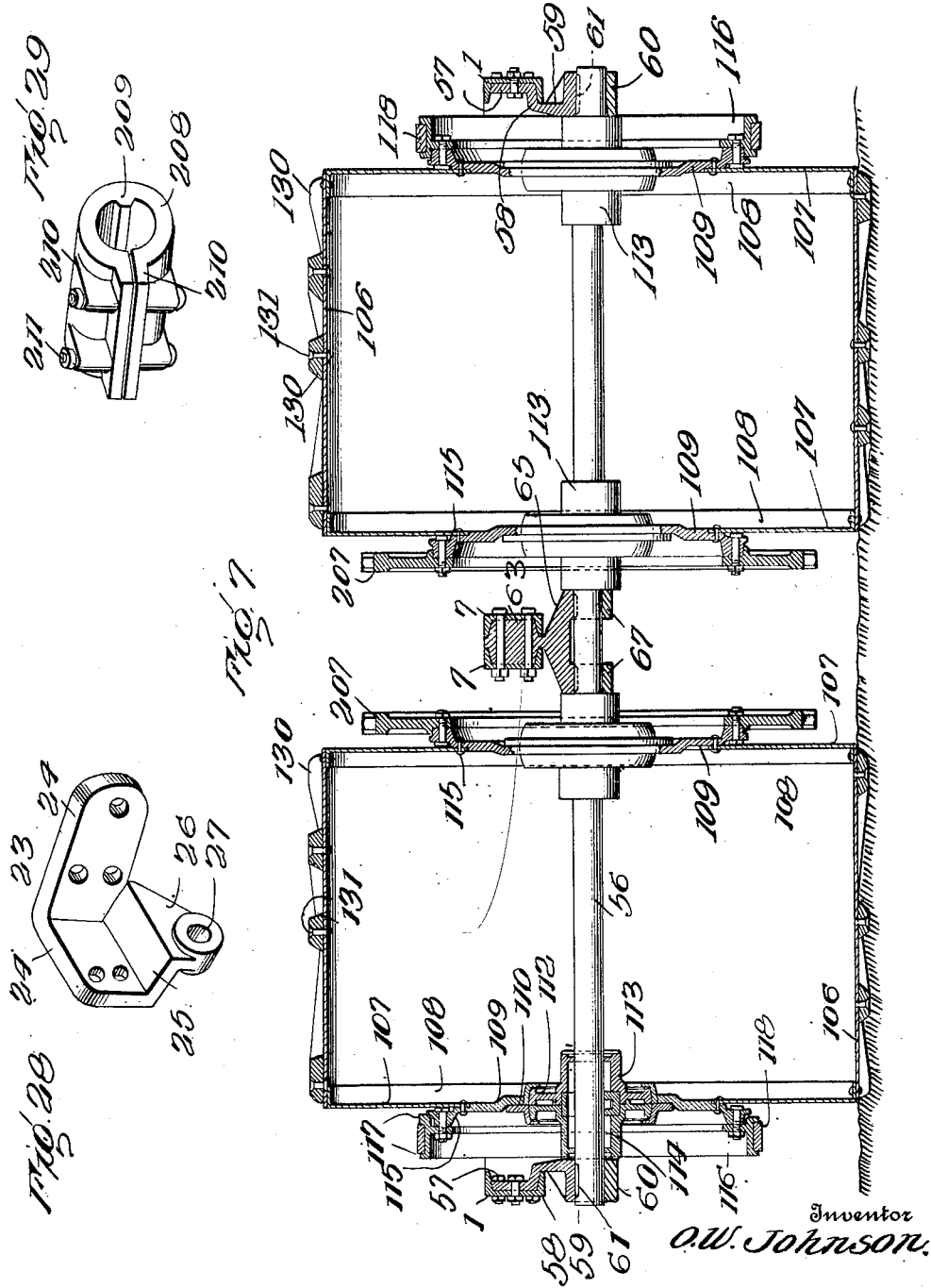

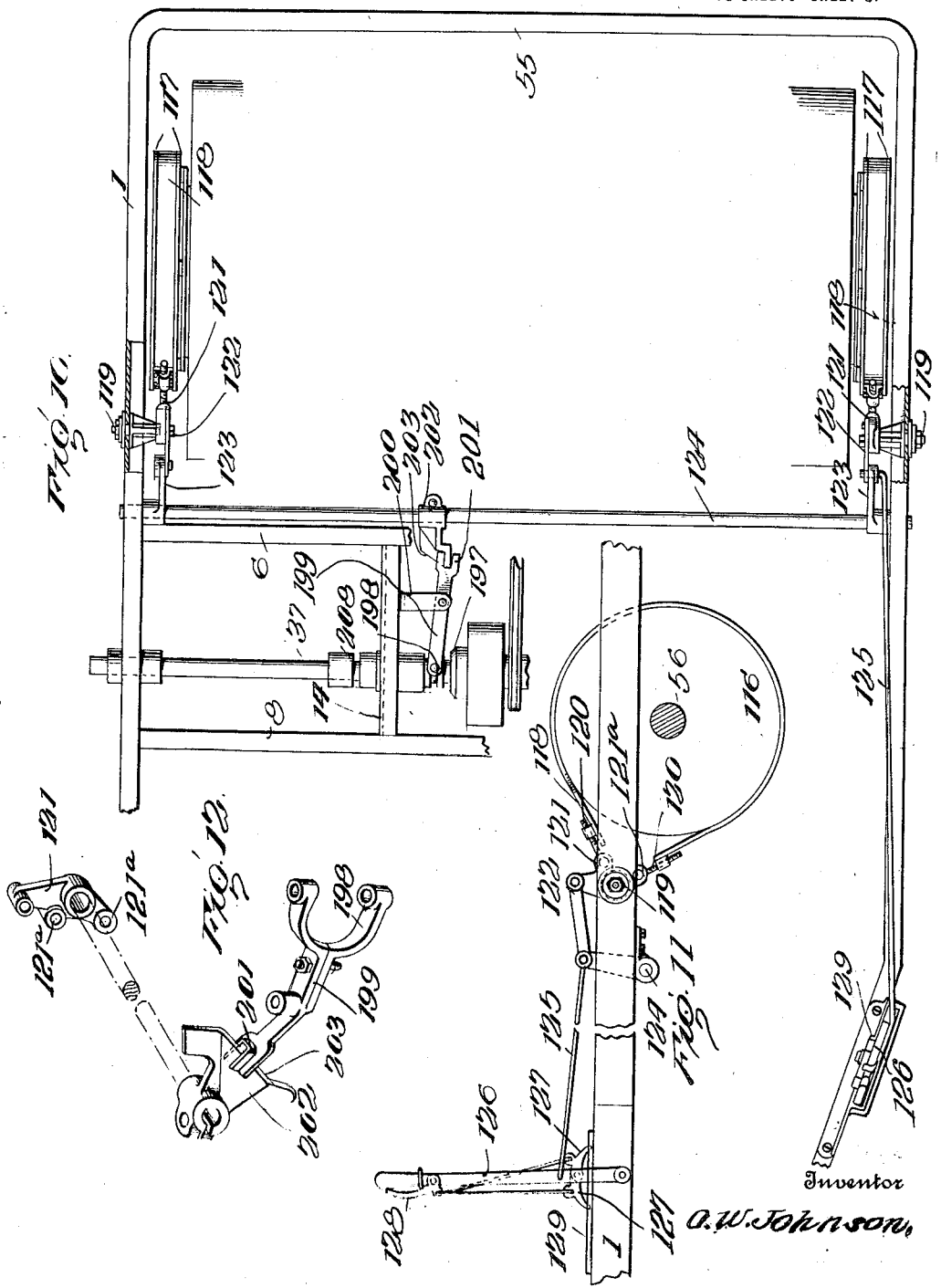

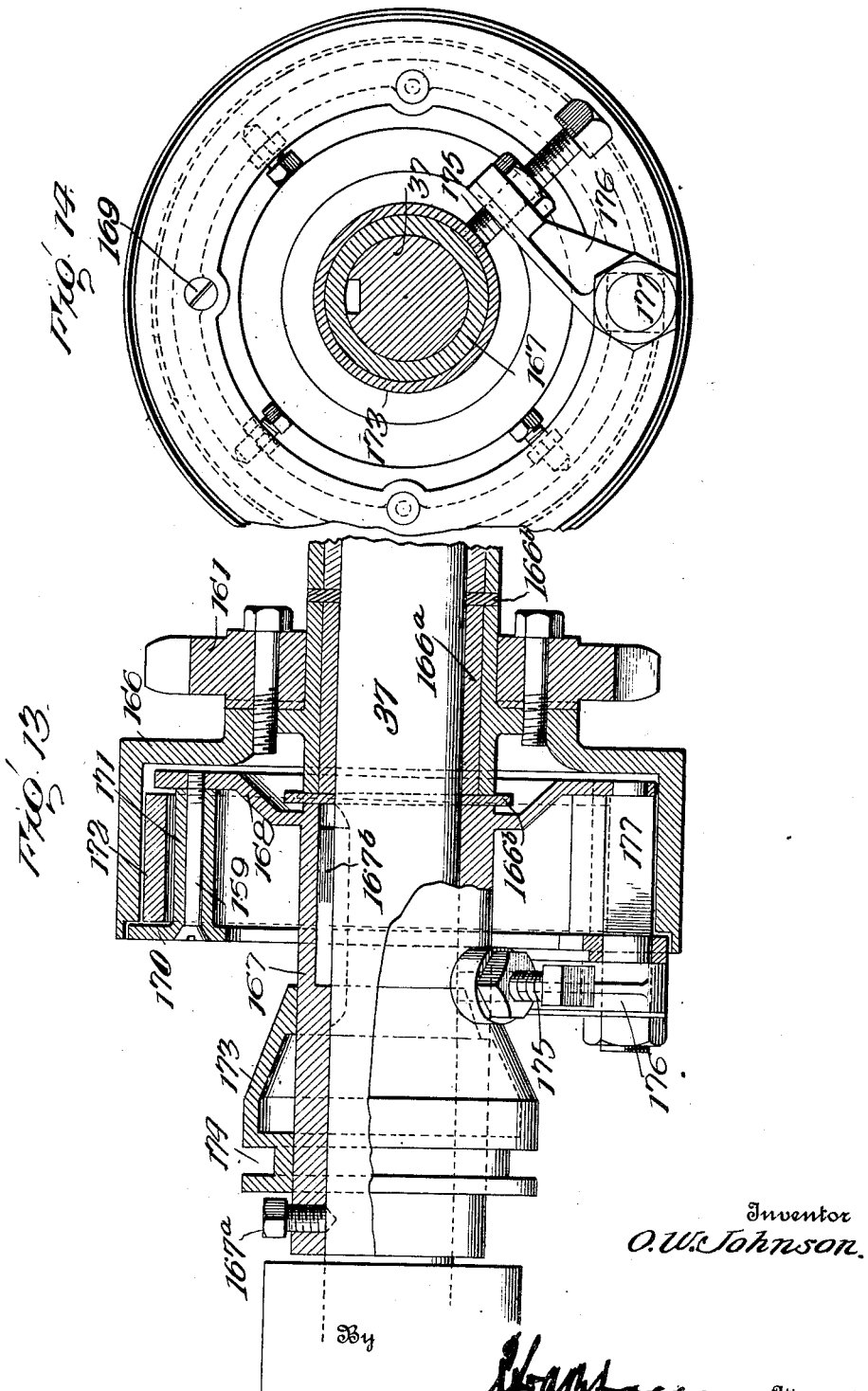

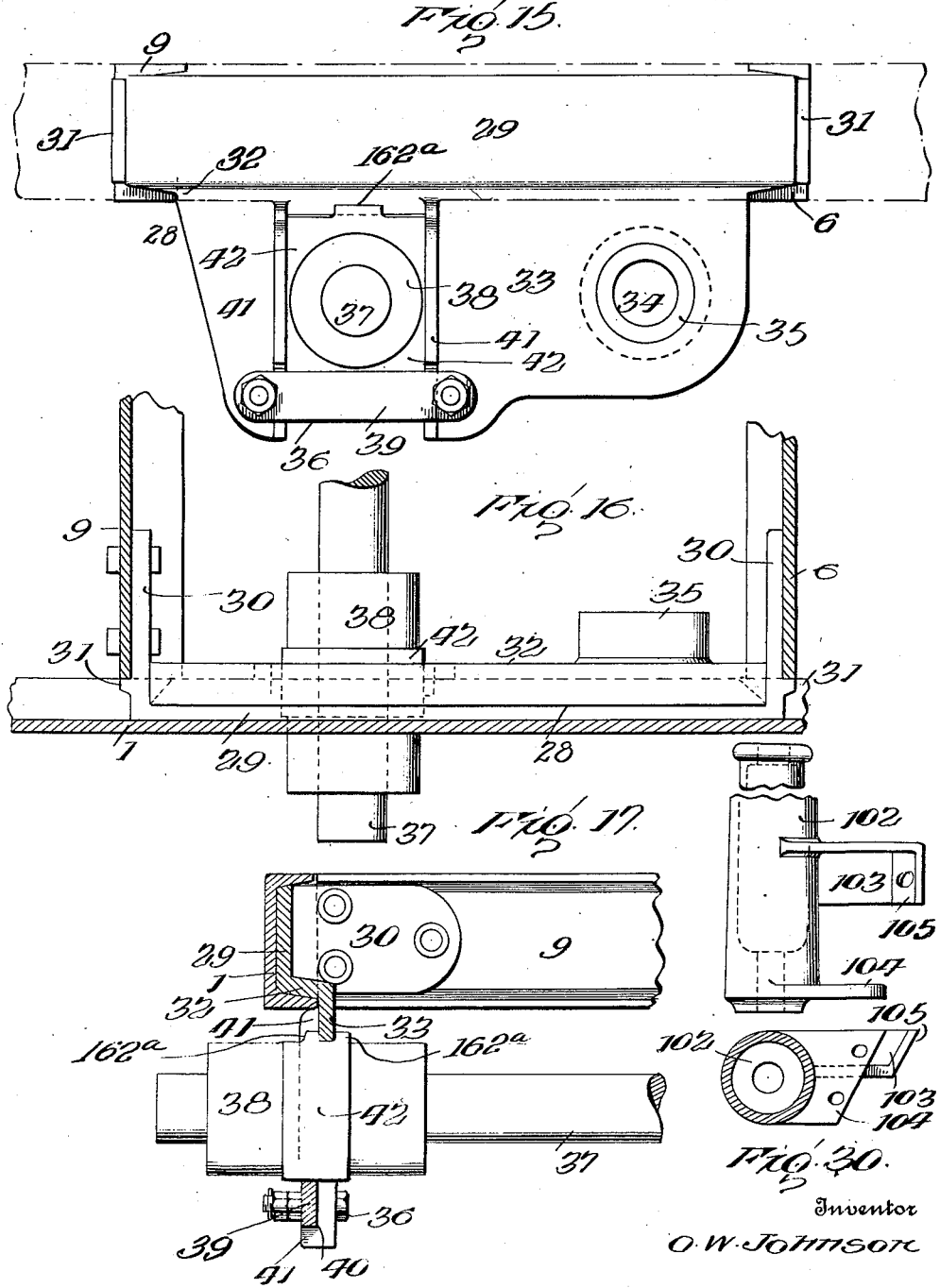

O. W. JOHNSON.
TRACTOR.
APPLICATION FILED AUG. 10, 1915. RENEWED DEC. 14, 1918.
1,307,673.
Patented June 24, 1919.
13 SHEETS—SHEET 11.
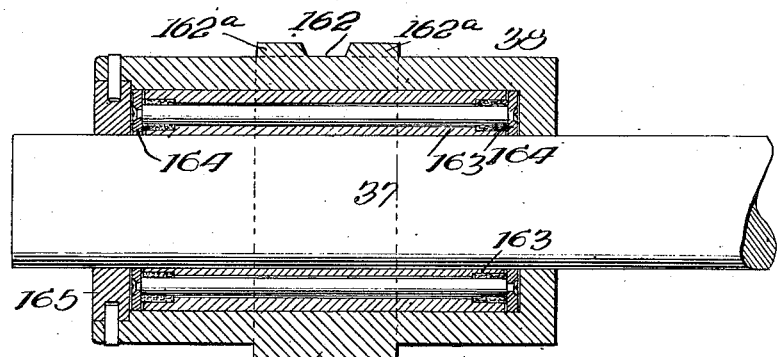
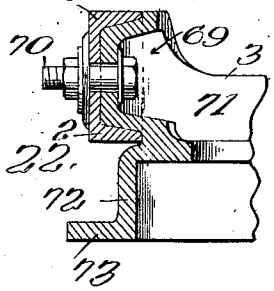
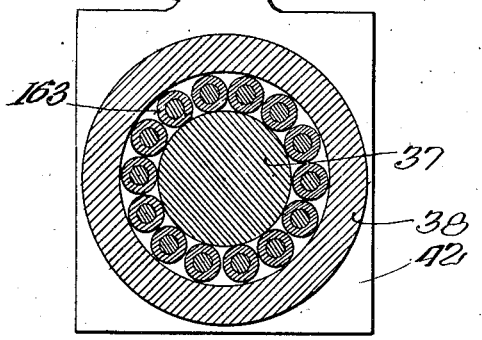
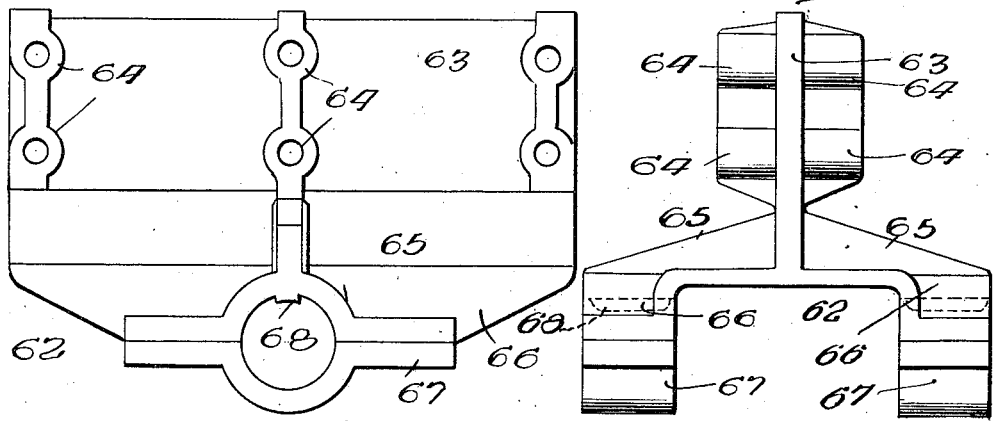
Inventor
O. W. Johnson
By
Attorneys

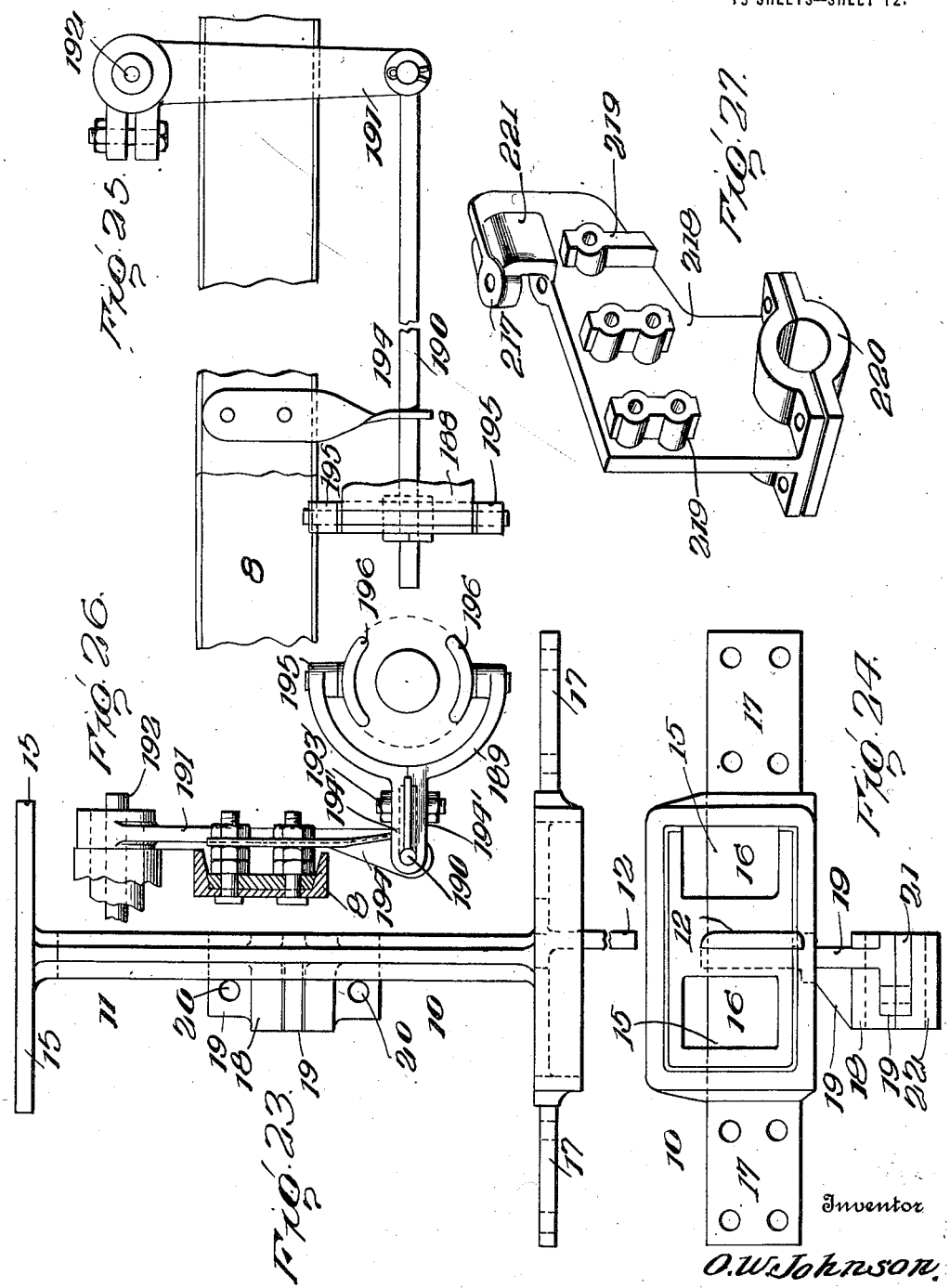

O. W. JOHNSON.
TRACTOR.
APPLICATION FILED AUG. 10, 1915. RENEWED DEC. 14, 1918.
1,307,673.
Patented June 24, 1919.
13 SHEETS—SHEET 13.
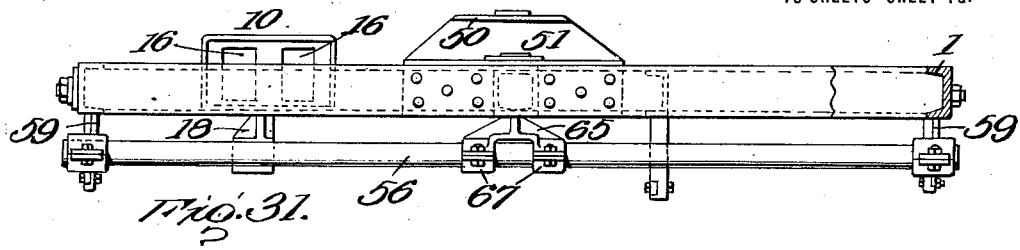
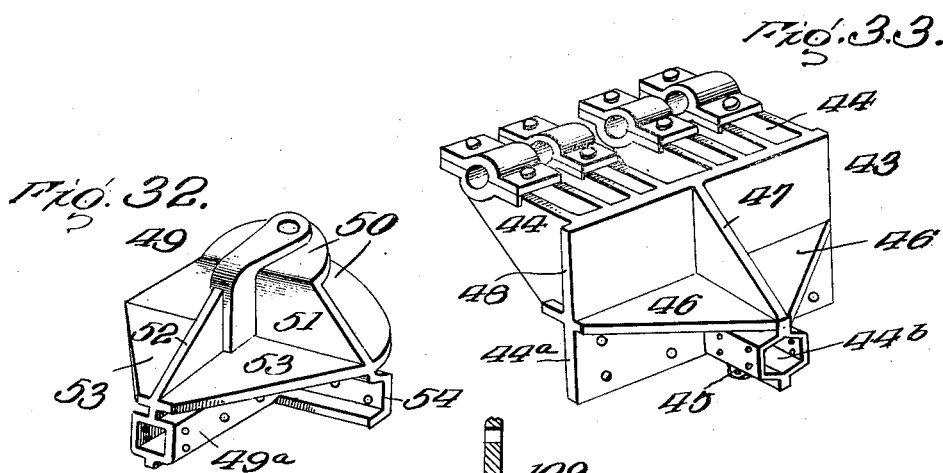
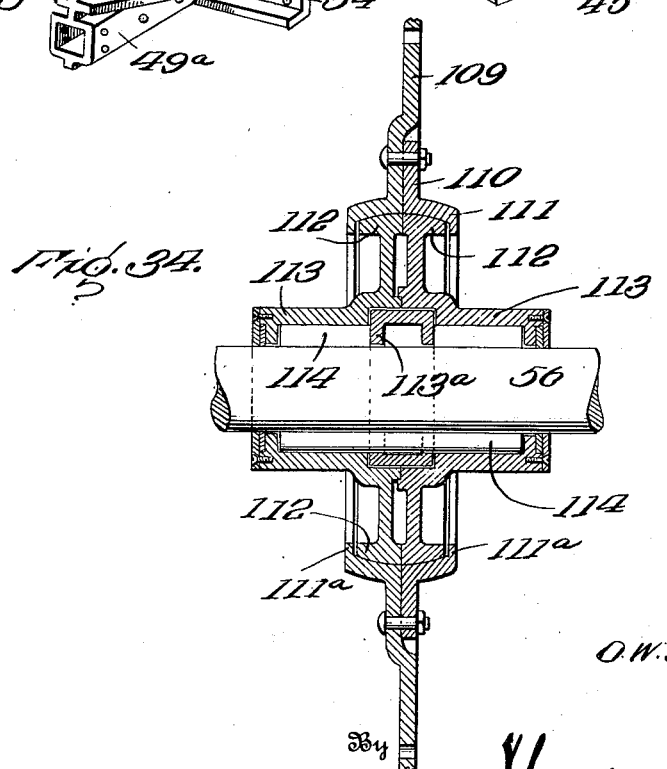
Inventor
O. W. Johnson
By *[signature]*, Attorneys

UNITED STATES PATENT OFFICE.

OLIVER W. JOHNSON, OF GENEVA, OHIO.

TRACTOR.

1,307,673.  Specification of Letters Patent.  Patented June 24, 1919.

Application filed August 10, 1915, Serial No. 44,805. Renewed December 14, 1918. Serial No. 266,813.

*To all whom it may concern:*

Be it known that I, OLIVER W. JOHNSON, a citizen of the United States, residing at Geneva, in the county of Ashtabula and State of Ohio, have invented certain new and useful Improvements in Tractors, of which the following is a specification.

This invention relates to tractors and its object, generally stated, is to provide a tractor for farm use which will be of less weight than machines heretofore provided for the same purpose and which will be capable of generating high power and variable speeds including a satisfactory road speed.

More specifically stated, one object of the invention is to provide a tractor for use upon farms, in vineyards, on public highways, in the fields of military operations and other places, which will be very strong and low down; which will be impossible to upset; which may pass under low trees or vines; and which may be produced at a low cost, the tractor being capable of pushing, pulling, or carrying a considerable weight.

An important object of the invention is to produce a machine which will most effectually withstand the racking and twisting to which it is subjected while in use, and to provide a construction which will possess some flexibility but will also be strong to prevent collapse under heavy strains.

Another object of the invention is to provide a tractor equipped with a cable so disposed that it may be utilized advantageously and readily to raise or lower agricultural implements, such as plows, cultivators, or harrows, and may also be utilized to assist in extricating the tractor from dead furrows or mud-holes, or over an obstruction.

A further object of the invention is to provide a tractor in which the engine or motor is so disposed relative to the transmission gearing that the power of the engine may be applied to propelling the machine, to driving other working mechanism, whether on the tractor frame or at a distance therefrom, or to raising or lowering agricultural implements hung upon the frame of the tractor, and to perform these several operations simultaneously or dissimultaneously.

Another object of the invention is to provide means whereby the tractor may be easily steered and to provide a frame which will possess maximum strength with minimum weight and in which the steering wheels will be mounted in such manner that shocks imposed upon the frame by contact with trees or other objects will be effectually withstood and the steering wheels easily manipulated.

A further object of the invention is to provide an improved form of tractor or driving wheel and also to provide means for arresting the movement of the propelling or tractor wheels and so arrange the said means that the application of power to the tractor wheels will be cut off prior to the application of the brake, and will not be again applied until after the brake is released.

Another object of the invention is to so support the main shaft that it may be easily removed from the main frame together with the parts mounted thereon and as easily secured in its proper position upon the main frame; also to provide an extension or supplemental shaft which may be readily attached to the main shaft at the will of the operator.

Other objects of the invention will appear as the description of the same proceeds and the invention resides in certain novel features which will be particularly pointed out in the claims following the description.

The invention is illustrated in the accompanying drawings in which:

Figure 1 is a plan view of a tractor constructed in accordance with my present invention.

Fig. 2 is a side elevation of the same.

Fig. 3 is a plan view of the main frame, with the working parts removed therefrom.

Fig. 4 is a side elevation of the said frame.

Fig. 5 is a transverse section taken on the line 5—5 of Fig. 1.

Fig. 6 is a transverse section taken on the line 6—6 of Fig. 1.

Fig. 7 is a transverse section through the driving or tractor wheels taken on the line 7—7 of Fig. 1.

Fig. 8 is a transverse section through the steering wheels on the line 8—8 of Fig. 1.

Fig. 9 is a plan view of the circular frame which carries the steering wheels.

Fig. 10 is a plan view of the brakes and parts coacting therewith.

Fig. 11 is an elevation of the same.

Fig. 12 is a detail perspective view of parts of the brake-operating devices.

Fig. 13 is a longitudinal section, with parts in elevation, of one of the clutches.

Fig. 14 is a view partly in elevation and partly in transverse section of the clutch.

Fig. 15 is an elevation of one of the brackets for supporting the main shaft.

Fig. 16 is a plan view of the same showing the position of the bracket upon the main frame.

Fig. 17 is a transverse vertical section thereof taken on the axial vertical plane of the main shaft.

Fig. 18 is a longitudinal section through one of the bearings for the main shaft.

Fig. 19 is a transverse section of the same.

Fig. 20 is a side elevation of one of the brackets or supports for the rear axle.

Fig. 21 is an end elevation of the said bracket.

Fig. 22 is a detail vertical section taken on the line 22—22 of Fig. 3.

Fig. 23 is a plan view of a bracket which furnishes a connection between parts of the main frame and also provides a support for one end of the windlass shaft.

Fig. 24 is a rear elevation of the said bracket.

Fig. 25 is a view showing in front elevation the means for manipulating one of the clutches.

Fig. 26 is a view partly in transverse section and partly in elevation of the same mechanism.

Fig. 27 is a perspective view of the bracket which supports the outer end of the windlass shaft or axle.

Fig. 28 is a detail perspective view of one of the corner brackets for joining the parts of the main frame.

Fig. 29 is a detail perspective view of a clamp for securing a supplemental or stub shaft to the main shaft.

Fig. 30 is a view showing, in elevation and in horizontal section, means for mounting the steering post upon the circular frame.

Fig. 31 is a rear end elevation, partly in section, of the main frame.

Fig. 32 is a detail perspective view of the rear coupling or draw bar.

Fig. 33 is a detail perspective view of the bracket which carries the differential shaft.

Fig. 34 is a vertical section through one of the bearings for the driving wheels.

In carrying out my invention, I employ a main frame 1 which is constructed of channeled steel and is substantially U-shaped in plan view, as shown clearly in Figs. 1 and 3. The sides and rear end portion of the frame are integral and the front extremities of the sides are bent inwardly obliquely, as shown at 2, so as to converge to and bear directly against a circular frame 3 which supports the steering ring or steering-wheel carrier 4. By making the frame integral as shown and as stated, I secure great strength with a minimum quantity of material and thereby provide a highly desirable frame at low cost. The circular frame 3 is secured to and between the front extremities of the oblique portions 2 of the main frame and also to a cross beam 5 which extends between the sides of the main frame at the rear ends of the inclined portions 2, as clearly shown in Fig. 3. The said circular frame 3 is thus very securely fastened and together with the converging front terminals of the main frame, forms an arch and circle construction which will withstand very heavy blows so that the machine may be driven over rough fields at a high speed without liability of its being seriously damaged. This construction of frame also permits the use of very light material while imparting the strength to stand the twisting or torsional strains which are placed thereon by the shifting of the steering wheels in guiding the machine and thereby especially adapts the tractor for use in military operations. In rear of and spaced from the transverse beam 5, and at about the longitudinal center of the main frame in the illustrated arrangement, I provide a cross beam 6, and longitudinal beams 7 extend between this cross beam and the rear end of the main frame as clearly shown. Between the beams 5 and 6, I provide cross beams 8 and 9 which are in alinement with each other and are connected by a bracket 10 which has a forwardly projecting branch 11 extending to the beam 5 and also has a rearwardly projecting lip 12 which is secured to a short longitudinal beam or hanger bracket 13 extending to the cross beam 6. A second short longitudinal beam or hanger bracket 14 extends between the beams 6 and 8 so as to effectually brace the structure and also support the main shaft, as will be presently more particularly set forth. The bracket 10 is shown fully in Figs. 23 and 24 upon reference to which it will be noted that the forwardly extending branch 11 of this bracket constitutes a short longitudinal beam extending between the beam 5 and the plane of the beams 8 and 9. The front end of the said branch 11 is constructed with lateral wings, indicated at 15, which fit within the channel of the front cross beam 5 and are bolted rigidly thereto. The main body portion of this bracket 10 is projected above the beams 8 and 9 as shown most clearly in Fig. 6, and is constructed with openings 16 at opposite sides of the beam portion 11, through which openings pass sprocket chains hereinafter described. At the opposite sides of the main portion of the bracket are wings or extensions 17 which fit within the channels of the beams 8 and 9 respectively and are bolted rigidly thereto as will be readily understood. Depending from the under edge of the forwardly extending branch 11, at the center of the same, is a hanger 18 which constitutes the upper member of a bearing or support for the inner end of the shaft which carries the windlass or cable drum. This hanger 18 is constructed with reinforcing ribs and flanges 19 and in some of the said flanges are openings 20 through which, and similar openings in flanges 21 of the lower bearing member 22, are passed suitable bolts to secure the said member 22 in position to support the windlass shaft.

In the angles or corners formed by the meeting of the side bars 1 and the ends of the cross beam 5, I secure right and left hand brackets 23, one of which is shown in detail in Fig. 28. These brackets are formed with wings or branches 24 which are adapted to fit in the channels of the side bars and the cross beam respectively and be rigidly bolted thereto so as to furnish a strong connection between the cross beam and the side bars. They are also constructed with a web 25 which extends inwardly over the lower flange of the adjacent side bar and has a depending projection or rim 26 in which is formed an eye 27 to permit the attachment of a road scraper or other implement to the tractor frame. By referring to Fig. 3 more particularly, it will be readily understood that the brackets 23 are disposed in the same transverse plane of the machine so that a rod or other supporting member may be fitted in the eyes 27 to carry the scraper or other implement. The ends of the beams 6, 8 and 9 are secured to the side bars by brackets 28 which are illustrated fully in Figs. 15, 16 and 17. The beams 13 and 14 are, substantially, duplicates of these brackets. These brackets comprise a central web 29 which is adapted to fit within the channel of the side bar, as clearly shown in Fig. 17, and at the ends of the said central web 29, are lateral wings 30 which fit within the channels of the cross beams and are bolted thereto. It will be readily understood that the ends of the cross beams will be spaced from the webs of the side bars by the upper and lower flanges of the side bars and to reinforce the connection and also aid in assembling the parts, the lateral wings 30 of the brackets 28 are provided with lugs or stops 31 which are so disposed as to lie flush with the edges of the flanges on the side bar and abut the ends of the cross beams, thereby serving as guides and gages to insure accuracy in the assembling of the parts. Inasmuch as no time is lost in measuring the parts when fitting them together, the operation of assembling the frame will be very rapidly accomplished. The main web 29 of this bracket 28 is extended over the lower flange of the side bar, as shown at 32, and then depends below the side bar to provide a hanger or supporting plate 33. This hanger or supporting plate is provided with an opening 34, reinforced by an annular rib or collar 35, to permit the mounting of a plow, harrow, or other agricultural implement upon the machine. It will be readily understood that the front end of the said implement will be pivotally secured in the opening 34 so that the implement may be readily raised or lowered in tillage operations. Near the front end of the plate or hanger 33 is a vertically disposed notch or slot 36 having an open lower end to permit the main shaft 37, with the bearings 38 therefor, to be readily pushed upwardly to its proper position relative to the plate, as will be readily understood on reference to Fig. 15. To support the said shaft and its bearing against dropping, a latch 39 is secured to the outer side of the hanger 33 and fits in seats 40 provided therefor in the ribs 41 formed on the face of the hanger at the sides of the notch 36. This latch 39 bears directly against the under side of an angular projection 42 on the bearing 38, the arrangement serving to hold the bearing positively in its position in the hanger as will be readily understood on reference to Fig. 15. It will be understood that the main shaft is supported in this described manner upon the side of the main frame and upon each of the beams 13 and 14 so that by merely releasing three latches 39, the entire main shaft with all the parts mounted thereon may be withdrawn. It will also be understood that the several gears, clutches, and bearings may be assembled upon the main shaft before the shaft is placed in the hangers and the assembled structure then placed in position.

The beams 7 are disposed with their channeled faces opposed to each other and the front ends of the said beams are disposed immediately adjacent the cross beam 6. Upon the said cross beam is fitted a bracket 43 (see Fig. 33) having forwardly projecting arms 44 above the said cross beam which furnish bearings for the differential shaft from which power is applied to the traction or driving wheels. The body of the said bracket has a depending portion 44$^a$ which fits against and is secured to the beam 6 and also has a laterally expanded depending portion 44$^b$ which fits within the channel of each of the beams 7 and is rigidly secured thereto by suitable bolts so that a strong connection between the beams 6 and 7 will be provided, it being understood that the front ends of the beams 7 abut the portion 44$^b$ of the bracket. The portion 44$^b$ depends below the beams 7 and is constructed with an eye 45 (see Figs. 2 and 3) which furnishes a bearing for a rock shaft forming a part of the brake mechanism as will be presently more particularly set forth. Extending from the upper portion of the depending webs are wings 46 constituting a plate which rests upon the upper sides or edges of the beam 6 and the beams 7, and a rib 47 rises centrally from the said wings 46 so as to reinforce the wall 48 from which the arms 44 project. It will be readily understood, that the beam 6 is so disposed that its channeled face will be on its forward side while the rear face will be smooth and that, consequently, the beams 7 may have their front ends abutting squarely against the bracket while the ends of the beams 13 and 14 are provided with lateral wings fitting in the channels of the beams 6 and 8 respectively so as to be rigidly secured thereto.

Between the rear ends of the beams 7 is fitted a laterally expanded web 49ª depending from the rear coupling 49 which has its coupling jaws 50 projecting rearwardly from a transverse body 51 which rests upon the upper side of the rear end of the main frame. The jaws 50 may be utilized to couple a wagon or other vehicle to the tractor so that the power of the tractor may be used to haul loads. The coupling body 51 has a central rib 52 which extends to the lateral wings 53 whereby the body will be reinforced and the depending web of the coupling has a transverse portion, indicated at 54, which fits into the channel of the rear end 55 of the main frame so that movement between the parts will be positively prevented. The top of this coupling is flat so that a wagon bolster may rest thereon and suitable openings are formed vertically in the jaws to receive a coupling pin which will be inserted through the bolster or through a wagon pole or other connection.

The axle or rod 56, upon which the propelling wheels are mounted, is carried in brackets which are secured rigidly to the side bars 1 and the longitudinal beams 7 at the centers of the same. One of the brackets for supporting the ends of the rod 56 is shown in Fig. 2 and is also shown in Fig. 7 from which it will be noticed that the said bracket has an upper web 57 which fits in the channel of the side bar 1 and is rigidly bolted thereto. From this web 57 the bracket is deflected, as shown at 58, over the lower flange of the side bar and has a depending portion or hanger 59 constituting the upper member of a clamp for securing the end of the rod 56. The lower edge of this hanger 59 is provided with a semi-circular notch and a supporting plate 60 having a corresponding notch is bolted rigidly to the lower edge of the hanger so as to support the rod or axle 56 as will be readily understood. The said rod or axle is not mounted for rotation, but is held against such movement by an immovable key 61 carried by and preferably integral with the hanger and seating in the rod. The brackets are duplicated at the two ends of the rod or axle and the central portion of the said rod or axle is supported by a bracket 62 shown most clearly in Figs. 7, 20 and 21. This bracket 62 has an upper portion comprising a central web 63 having lateral tubular projections 64 on its sides which are adapted to fit closely within the channels of the opposed beams 7 and receive bolts by which the bracket is secured rigidly to and between the said beams. It will be readily understood that the web 63 fits between the flanges of the beams 7 so that transverse movement of the bracket is positively prevented and it is intended to use a sufficent number of bolts to positively prevent longitudinal movement of the brackets without shearing of the bolts. Below the web 63, the bracket is expanded laterally, as shown at 65, and from the ends of the said expanded portions depend hanger members 66 to which are bolted the plates 67 which extend under the axle or rod 56. A key 68 is formed in the semi-circular notch of each hanger 66 so as to aid in preventing the rotation of the axle. The construction just described effectually secures the axle 56 to the main frame and provides an additional brace for the main frame so that spreading or twisting of the frame at the rear end is prevented. It will be readily noted that my frame is very efficiently braced throughout so that it may be constructed of light material and will be found strong enough to withstand very severe usage.

As previously stated, the front ends of the main frame are secured to a circular frame 3 which is supported by the steering ring 4. As shown most clearly in Fig. 22, the circular frame 3 is provided with lugs, offsets, or bosses 69 which are so shaped as to fit closely within the channels of the portions 2 of the main frame and a securing bolt 70 is inserted through the said lug or boss 69 and the immediately adjacent portion 2 of the main frame so as to secure the circular frame 3 rigidly to the main frame. It will be readily understood that by providing these bosses 69 I obtain an extended engagement between the circular frame and the main frame so that the strain applied to the parts is not transmitted entirely to the securing bolt but is borne by the said bosses also and shearing of the bolt, and the consequent dropping of the circular frame with resultant serious damage to the machine, is avoided. The lugs 69 are formed upon an upper portion 71 of the frame 3 and below the said portion 71, the frame is provided with a depending rail 72 having an outwardly projecting horizontal flange 73 at its lower end. The portion 72 of the circular frame is provided with a vertical wall and an overhanging wall adapted to coact with the outer surface of the steering ring 4 to form a raceway for balls or other anti-friction devices, as shown in Fig. 8, whereby the weight of the circular frame and the front end of the main frame will be carried by the steering wheel without excessive wear upon the parts. Brackets 74 are secured at intervals to the flange 73 and depends therefrom and are then turned inwardly in spaced relation to the flange so as to project under the steering wheel carrier and thereby guard against separation of the parts and dropping of the steering chain.

In Fig. 8, I have shown balls 75 disposed in the raceway formed by the depending rail portion 72 and the outer peripheral surface of the steering ring 4. Upon the peripheral surface of the said ring 4, I form a concave annular seat, indicated at 76, which supports the balls or rollers 75 and below the said seat, the steering ring is constructed with an annular groove or spaced annular ribs, as shown at 77, whereby to accommodate the steering chain 78. The ring is further provided, within the said chain-receiving groove or recess, with lugs 79 (see Fig. 9) in which may be engaged hooks, turn-buckles or similar devices at the ends of the steering chain so as to secure the chain to the steering ring and compensate for the wear of the chain. As shown in Fig. 9 the lugs 79 are located apart about one-third of the periphery of the steering ring and I am thereby enabled to get a positive pull upon the ring so as to turn the same through a wide arc in the operation of steering around a corner without liability to detach the chain. The steering post 80 is disposed in the triangle formed by the circular frame, one of the portions 2 of the main frame, and the front cross beam 5, as shown most clearly in Fig. 1, and the steering chain 78 passes around a sprocket pinion 81 on the lower extremity of the steering post whereby the chain will be supported and will be positively actuated when the steering post is manipulated. A handle wheel 82 is provided at the top of the steering post and a seat, indicated in dotted lines at 83, in Fig. 2, is disposed over the drum or windlass immediately in rear of the steering post so that the operator may easily reach and control the same. The steering ring is provided with a small upstanding tooth or lug 84 upon its upper edge at a point midway between the inwardly extending brackets 85 which provide supports for the axle of the steering wheels. This tooth or projection is adapted to coöperate with the ribs 86 formed on the circular frame 3 so as to accurately gage the turning of the machine. The frame 3 is further provided with a bracket or coupling 87 which corresponds, in general form to the coupling 49 at the rear end of the main frame so that, if desired, the tractor may be coupled to a vehicle so as to either push or pull the same. This coupling bracket 87 should be made quite large and heavy so that it will withstand the shocks imposed upon the structure by the machine striking large trees or rocks through careless steering or other causes. The brackets 85 are preferably formed integral with the steering ring 4 on the inner peripheral wall of the same and are provided in their under sides with notches or recesses adapted to receive the front axle 88. The axle is supported in the said brackets by plates 89 rigidly secured to the under sides of the brackets 85, as will be readily understood. The steering wheels 90 are rotatably mounted upon the axle 88 and consist of drums 91 to the inner peripheral surfaces of which are secured disks or plates 92 having flanges 93 at their outer edges through which bolts or rivets are inserted to secure the said plates to the drums. These rivets or bolts are shown at 94 in Fig. 8 and also serve to secure tread rings or tires 95 to the outer surfaces of the drums. The inner edges of the plates 92 are seated against and rigidly secured to annular flanges or ribs 96 which project from sleeves or cylindrical casings 97 within which are provided a series of rollers 98 which fit between the axle 88 and the inner wall of the casing 97 so as to provide anti-friction bearings for the steering wheels to permit their free rotation about the axle. The outer ends of the casings 97 are closed by caps 99 which may be secured to the axle in any convenient manner while the inner ends of the said casings are covered by a spacer 100 having a collar 101 at its edge which projects over the opposed inner ends of the casings, as will be readily understood on reference to Fig. 8. It will be readily noted that the steering wheels may rotate very freely about the axle and the tread rings or ribs 95 will effect a very secure engagement of the steering wheels with the ground so that skidding will be reduced to a minimum. Moreover, the construction is very economical as the drums may be produced very easily and may be made of light material, inasmuch as the tread rings 95 and the inner disks or plates 92 effectually brace the drums and prevent collapsing of the same.

The machine is steered by turning the hand wheel 82 in one or the other direction so as to impart motion to the steering post and through the same and the chain 78 to the steering ring. The lug or tooth 84 and the ribs 86 are important features of my steering mechanism inasmuch as the ribs serve to indicate points beyond which the tooth 84 should not be carried as the steering wheels will then be disposed almost at a right angle to the driving wheels and, consequently, the efforts of the engine to propel the machine will be apt to cause it to turn over the steering wheels instead of following them about a corner. At the same time, when the steering ring has been turned so that the tooth 84 is substantially in alinement with either rib 86, the machine may be turned to either side and will be driven around the turn by one of the driving wheels, the other driving wheel serving practically as a pivot for the machine in its steering movement.

The steering post 80 is mounted in a hollow casing 102 so that it may rotate readily and will be supported in its proper operative position at all times. This hollow casing 102 is provided at its lower end with lateral brackets or attaching plates 103 and 104. The lower of these plates or brackets, 104, is adapted to extend under the flange 73 of the circular frame 3 and is provided with openings through which bolts or rivets may be inserted to secure the same to the said flange. The upper bracket, 103, is provided with a depending rib or strengthening wall 105 and is adapted to fit directly against the outer surface of the rail or depending portion 72 of the circular frame 3 and be rigidly secured to the same.

The driving or tractor wheels are mounted upon the rear axle 56 so as to rotate about the same and comprise drums consisting of cylindrical shells 106 having heads 107 secured in their ends by means of bolts or rivets inserted through annular flanges 108 formed on said heads and through the shells as will be readily understood. The heads 107 are secured to circular plates 109 which are disposed concentric with the axle 56 and are in turn secured to annular ribs 110 formed on the outer surface of rings or collars 111 having concave inner surfaces which receive the convex outer peripheries of rings 112 which project from the cylindrical casings or sleeves 113 containing rollers 114 which bear upon the axle 56 as shown in Figs. 7 and 34, and thereby permit the drums to rotate easily and with very little wear about the axle.

By referring particularly to Fig. 34, it will be noted that the rib 110 fits within a dished portion of the plate 109 and the central portion of the said plate is the complement of the ring or collar 111. The rings 112 and the sleeves 113 are duplicated and are held in place by the collars 111 and the complementary portions of the plates 109. The engaging concave and convex surfaces of the members 109, 111 and 112 permit the drums or traction wheels to rock in vertical planes and thereby permit the machine to be driven over very rough roads without being subjected to racking strains. Internal annular radial flanges 111ª are formed on the rings 111 and the plates 109 to lie alongside of or overlap the rings 112 and thereby limit the rocking movement so as to prevent separation of the parts. The inner ends of the sleeve 113 are expanded annularly to fit around the spacing ring or cage 113ª which position the rollers 114 while the outer ends of the sleeves are closed by caps or washers in any preferred manner.

The central circular plates 109 have their outer edges offset from the heads 107, as shown at 115, and to these offset edges, I secure a ring 116 constituting one member of the brake mechanism. This ring or brake drum 116 is constructed with side flanges 117 and around the said member between the said flanges is disposed a brake band 118. In the side bars of the main frame at points in advance of the brake drums 116, I provide pins or studs 119 on which are fulcrumed levers 121 having eyes or perforated lugs 121ª disposed eccentrically above and below the fulcrum which are engaged by turnbuckles 120 attached to the ends of the brake band. This lever 121 projects upwardly from the stud and is connected by a link 122 to a crank arm 123 carried by the rock shaft 124 which is mounted in the bearing 45 and in similar bearings provided upon the side bars. The crank arm 123 at one end of the rock shaft has its upper end pivoted to a connecting rod 125 which extends forwardly and has its front end pivoted to a handle lever 126 fulcrumed upon the main frame immediately adjacent the steering post. This lever carries dogs 127 controlled through a handle 128 and adapted to engage notches formed in the upper side of a bracket 129 secured upon the main frame, the said bracket being slotted to fit around the lever and thereby hold the same against lateral vibration, the dogs acting alternately so that one will hold the lever in a forwardly adjusted position and the other will hold the lever in a rearwardly adjusted position, the inactive dog merely sliding on a smooth portion of the upper surface of the bracket. It will be readily understood, on reference to Fig. 11, that if the lever 126 be manipulated so as to rock the shaft 124 and also cause the lever 121 to swing forwardly, the brake bands will be tightened about the brake drums and arrest the rotation of the driving wheels. It will also be noted that the driving wheels are so mounted upon the axle that they may rotate freely about the same and also be permitted to oscillate in a vertical plane so as to accommodate movement of the machine over a rough or uneven surface. Smoothness and flexibility of travel is thus attained without any sacrifice of strength in the frame.

Upon the outer peripheral surface of each drum 106, I secure series of shoes or tread plates 130. These shoes or tread plates are disposed in two series as shown most clearly in Fig. 1, the adjacent ends of the shoes of the two series extending past the central radial plane of the drum, whereby they will overlap, and the shoes being disposed at an inclination or diagonally upon the periphery of the drum so that, when the machine is traveling, one shoe or tread plate will engage the surface of the ground before the preceding shoe or tread plate leaves the ground and the adjacent shoes will be so close together that there will be no jarring in the travel of the machine and, while it will be positively propelled and skidding will be prevented, the defacing and disruption of paved roads will be avoided. The several series of tread plates are secured positively to the frame by bolts or rivets 131 inserted through the ends of the plates into the drum and having their outer ends flush with the surfaces of the shoes.

The engine may be of any desired character but will preferably be of the internal combustion type and is indicated conventionally at 132. As shown in the drawings, the engine does not extend longitudinally of the machine, but is disposed transversely thereof so that it economizes space and permits the machine to be more readily balanced. The engine will be preferably disposed within a housing or casing 133 and the fuel tank 134 will preferably be disposed transversely of the machine in the center of the same and in advance of the cross beam 5, being supported in brackets 135 which are constructed in two parts adapted to encircle the tank at the ends of the same and connected by a suitable bolt or other fastening 136. The lower of these parts projects from the upper end of a standard 137 rising from the cross beam 5 and bolted rigidly thereto. The fuel tank may be connected in any convenient manner with the carbureter so as to feed the same and supply fuel to the engine, and, as it is in advance of the engine and at the front end of the machine, the danger of the tank being heated is minimized. At the front side of the casing 133 which incloses the engine, is placed a radiator 138 and across the front side of the said radiator is a bar 139 which supports a fan casing 140 in which is a fan 141 driven through a belt 142 and suitable pulleys from the shaft of the engine. The radiator is connected by pipes 143 with the water jacket of the engine and a suitable pump whereby circulation of the water is effected and the temperature of the engine kept at the proper degree. The engine shaft is shown at 144 and carries a fly wheel 145 which is constructed with sprocket teeth 146. A housing 147 contains the usual transmission gear and the outer end of the transmission shaft is disposed between the said housing and the bracket 10 and carries a sprocket wheel 148 around which is trained a sprocket chain 149. Supported by the engine housing 133 and by a standard 150 rising from the casing 147 is a slidably mounted starting shaft 151, one end of the said shaft being provided with a crank or other handle 152 while the other end of the shaft is fitted in a collar 153 having ratchet teeth 154 upon one edge. Between the fixed bearing 155 and the stop 156 upon the starting shaft, a spring 157 is coiled around the shaft so that, by its expansion, it tends to hold the crank 152 away from the standard 150. A pinion 158 is mounted upon the said shaft and this pinion has a hub provided with ratchet teeth 159 which are adapted to engage the ratchet teeth 154 on the collar 153. When it is desired to start the engine, the shaft 151 is pushed inward so that the pinion 158 will be carried into mesh with the teeth 146 on the fly wheel 145. The ratchet teeth 159 will then be in engagement with the ratchet teeth 154 and, consequently, if the shaft 151 be rotated, the collar 153 and the fly wheel 145 will be also rotated. The rotation of the fly wheel will start the engine in the usual manner and, when the engine commences to operate under the force of explosions, the fly wheel will cause the pinion 158 to rotate at a higher speed than the collar 153 so that the ratchet teeth 159 will ride out upon the ratchet teeth 154 and push the pinion out of engagement with the fly wheel. Injury to the operator is thereby avoided. It will be readily noted that the starting shaft may be manipulated from the seat 83.

The casing 147 houses the usual transmission or reversing and speed-reducing gearing as previously stated and the said gearing is controlled through a lever 160. The motion imparted to the transmission shaft will set up rotation of the sprocket wheel 148 and will be transmitted through the chain 149 to a sprocket wheel 161 upon the main shaft 37. The said shaft 37 is supported in the hangers 33, as previously described and the sleeves 38 which encircle the shaft are preferably formed integral with the angular members 42 so that the shaft will be supported in position to properly transmit the motion to the several working mechanisms. The upper portion of the member 42 is grooved or recessed, as shown at 162, (Fig. 18), to engage the edge of the upper wall of the notch 36. The grooves 162 are provided by forming upon the upper side of the member 42 small lugs 162ᵃ which engage the top edge of the notch 36 sufficiently close to prevent longitudinal movement of the bearing and the shaft but which are short enough to permit relative rocking movements of the parts so that the shaft is not apt to break under the twisting strain to which it is subjected during the travel of the machine. Bearing rollers 163 carried in spacer rings 164 are mounted within the casing 38 and the outer end of the casing is closed by a cap 165, a slight clearance being left between the ends of the rollers and the ends of the casing so that the shaft 37 may move in any direction without becoming disengaged from its supports and the working elements may readily accommodate themselves to the vibration of the machine in traveling over rough surfaces.

The sprocket wheel 161 is secured to a drum 166 rotatably fitted upon the main shaft 37 or a bushing thereon adjacent the end of a sleeve 167 which is secured to the shaft by a set screw 167ª and by a key at 167ᵇ. This sleeve 167 is constructed with an annular rib or flange 168 to which is secured, by bolts 169, a retaining ring 170, spacing sleeves 171 being fitted around the said bolts between the flange and the ring to maintain the same in spaced relation. A clutch band 172 is disposed between the flange 168 and the ring 170 radially beyond the bolts 169 and the sleeve 171 and this friction band is arranged adjacent the inner peripheral surface of the drum 166 as shown most clearly in Fig. 13. A clutch-operating member consisting of a tapered collar 173 is slidably mounted upon the sleeve 167 and is constructed with an annular groove 174 which may be engaged by a shifting instrumentality. The tapered collar 173 is adapted to ride under the end of a screw or bolt 175 which is mounted in the end of a lever 176 secured rigidly to a short shaft 177 which is rotatably mounted in the flange 168 and the ring 170. This shaft 177 is secured to the opposite ends of the friction band 172 so that if the screw 175 is moved radially outward, the friction band will be expanded so as to bind against the inner peripheral surface of the drum 166 and thereby clamp the sprocket wheel 161 to the shaft 37. It will be readily understood that, as the shaft 177 is connected to the band 172 and is mounted in the ring 170 and the flange 168, any movement imparted to the band will be transmitted through the flange 168 and the sleeve 167 to the shaft 37. When the band is caused to frictionally engage or bind against the drum 166, the sprocket wheel 161 which is secured to said drum will be locked to the band and will consequently impart motion to the shaft 37. A bushing 166ª is preferably interposed between the shaft 37 and the drum 166 and washers 166ᵇ are fitted on the shaft at the ends of the sleeve. The groove 174 is engaged by a yoke 178 carried by an arm 179 depending from a rock shaft 180 mounted in suitable bearings upon the transmission casing 147 and provided with a lever 181 which may be easily reached by the operator in the seat 83. The shaft 37 carries other sprocket wheels 182 and 183 which may be caused to rotate with the shaft in the same manner as that just described for the sprocket 161, and a detailed description of the several clutches is deemed unnecessary as the operation of all the clutches is substantially the same as that just described. The sprocket 161 imparts motion to the shaft 37 however, while the sprockets 182 and 183 receive motion from the shaft and transmit the same through sprocket chains 184 and 185 respectively to the sprocket wheels 186 and 187. The clutch-controlling collar 188 for locking the sprocket 183 to the shaft 37 is shifted by means of a yoke 189 carried by the end of the rod 190 having its inner end pivoted to a rocking arm or lever 191 which depends from a rock shaft 192 mounted upon the transmission housing 147 and operated by a lever 193 disposed in rear of the transmission controlling lever 160. The rod 190, as shown most clearly in Figs. 25 and 26, is supported and slides in a hanger 194 secured to the beam 9 or the bracket 10 and the yoke 189 is clamped upon the end of the bar 190 by bolts 193' inserted through mating lugs 194' which encircle the rod or bar. From the lugs 194', the arcuate members of the yoke extend and at the ends of said members, are eyes 195 in which are pivotally fitted shoes 196 adapted to rest in the groove of the member 188. Pivotal connection of the shoes to the yoke will permit them to accommodate the relative angular movement of the yoke and the shifting member 188 and this same construction is employed in all the yokes provided for shifting the clutch-controlling members.

The member 197, which controls the clutch for locking the sprocket 182 to the shaft 37, is engaged by a yoke 198 on the end of a lever 199 which is fulcrumed upon a bracket 200 projecting from the beam 14 connecting the beams 8 and 6. The rear end of this lever 199 is forked as shown at 201 and is engaged by a cam 202 secured upon the rock shaft 124. This cam is so timed, relative to the crank arms 123, that the clutch will be thrown out before the brakes are applied and, reversely, the brakes will be released before the clutch is thrown in. The cam 202 has an inclined working portion 203 which is directly engaged by the fork 201 and it will be readily understood that, when the shaft 124 is rocked, the cam 202 will be caused to ride through the fork 201 and thereby swing the lever 199 about its pivotal connection with the bracket 200. The end portions of the cam are disposed in radial planes of the shaft 124 so that movement of these portions through the yoke will have no effect upon the lever, and the inclined portion 203 will be of such length that sufficient play will be provided to prevent the brakes being applied while the clutch is in or the clutch being thrown in while the brakes are applied. In other words, the several parts are so proportioned and arranged that the inward movement of the clutch will not commence until after the brakes are released and the outward movement of the clutch is effected before the brakes are applied.

The sprocket 186 is a member of the differential gear connecting the alined sections of the differential shaft 204 journaled in the bearings at the forward ends of the arms 44 and upon the said shaft 204, I secure sprocket wheels 205 around each of which is trained a sprocket chain 206 which passes around a sprocket wheel 207 secured to the offset portion 115 of the inner head of a drum 106. Motion will thus be positively transmitted to the said drums and the tractor caused to travel. It will be readily understood that the direction of travel is controlled by the transmission in the housing 147 which may be adjusted by the lever 160. It will also be understood that the machine may be held stationary while the shaft 37 continues to rotate and power taken from the said shaft to drive other machinery.

It is often desirable to operate machinery which is independent of the tractor from the shaft 37 and to accomplish this result, I construct the end of the shaft 37 to receive a clamp 208 which is constructed with a key 209 adapted to engage a seat in the shaft 37. It will be readily noted from Fig. 29, that the clamp is in the form of a sleeve having the key 209 on its inner surface and split so as to provide the lugs 210 through which clamping bolts or screws 211 may be inserted to secure the sleeve tightly about the shaft. It is my purpose to supply suitable stub shafts with each machine which stub shafts may be engaged by the clamp 208 and thereby secured to the main shaft 37 whenever needed so that the motion of said shaft 37 will be transmitted directly to the stub shaft from which it may be carried to any desired point in any convenient way, it being understood that the stub shaft will have a sprocket wheel, a gear wheel, or a band pulley secured thereon.

The sprocket wheel 187 is secured to one end of the windlass or drum 212 which is carried by the axle 213. A cable 214 is wound upon this windlass and this cable may be extended to the rear of the machine and over a suitable guide pulley to the agricultural implements hung within the openings 34 of the plates 33 or it may be utilized in other ways. The important use of this cable however, is to permit the tractor to extricate itself from mud-holes. When the ground is soft, it is impossible to obtain sufficient tractive force from the drums or driving wheels 106 to carry the machine out of deep mud-holes. In this event, the cable 214 may be carried forward under the front end of the machine and secured to a large tree or any other convenient fixed object. If the engine be then started, the cable will be wound upon the drum and will exert a pulling force which will coöperate with the driving force of the traction wheels so that the machine will quickly move out of the hole into which it may have dropped. It will be readily understood that the several sprocket wheels will be so proportioned that the rotation of the drum will be at the same speed as the rotation of the driving wheels and consequently, the pull of the cable will be the same as the push of the wheels and slipping of one relative to the other will be avoided. Retrograde movement of the windlass is prevented by means of a dog 215 arranged upon the main frame and adapted to engage ratchet teeth 216 formed in the outer end of the windlass. This dog is pivoted between the upper edge of the side bar 1 of the frame and a lug or ear 217 formed on the bracket 218. The said bracket 218 is provided on its outer face with blocks or fillers 219 which are adapted to fit within the channel of the side bar 1 and receive bolts by which the bracket is secured to said side bar. The lower end of the bracket forms one-half of a clamp or bearing for the axle 213, the said clamp being completed by a plate 220 secured to the bracket, as will be readily understood upon reference to Fig. 27. The lug 217 is formed on an offset 221 at the upper edge of the bracket which rests upon the upper edge of the side bar, as will be readily understood. The pawl or dog 215 projects laterally beyond the said lug and is adapted to bear against the front edge of the offset 221 which thereby serves as a stop to limit the outward movement of the dog. A rod 222 is secured to the outer end of the dog and rises therefrom at the side of the seat 83 so that the operator may easily push the dog out of or into engagement with the windlass.

A platform or cover will be built over the tire apparatus so as to prevent injury to the operator through contact with the moving parts. This platform will also provide a support for ballast which will add weight to the machine and thereby increase the tractive force of the rear driving wheels in order that travel over soft roads or fields may be readily effected. It will also serve as a carrier for loads such as sacks of grain, bales of hay, etc., and may be provided with removable side boards whereby various sizes of loads may be accommodated.

It will be noted that the bearings or points of suspension of the steering wheels, the driving wheels and all the power-transmitting shafts are below the main frame so that all weight is brought low and below the center of gravity. The machine, therefore, will not upset and because of its low build is valuable for use in orchard and vineyard cultivation as it will pass readily under trees and vines without injuring them. The light weight of the machine with its broad wheel base eliminates the ground-cutting and resultant root-injuring which is incidental to the use of other heavy tractors.

Having thus described my invention, what I claim and desire to secure by Letters Patent is:

1. In a tractor, the combination of a U-shaped main frame, a circular frame secured between the front ends of said main frame, cross beams secured within the main frame in the forward portion thereof, longitudinal beams secured to and extending between the rearmost cross beam and the rear end of the main frame, and an axle secured rigidly to the said longitudinal beams and the sides of the main frame to tie the said parts together and resist additional strain on the frame.

2. In a tractor, the combination of a substantially U-shaped channeled main frame, a circular frame fitted between the front ends of said main frame and having lateral offsets seating in the channel thereof, and securing bolts inserted through the said offsets and the main frame.

3. In a tractor, the combination of a frame, an engine mounted thereon, a main shaft mounted upon the frame in rear of the engine, operative connections between said shaft and the engine, driving wheels mounted at the rear end of the frame, a shaft disposed between the main shaft and the driving wheels, operative connections between the said shafts, operative connections between the second shaft and the driving wheels, and means on the main shaft whereby it may be disconnected from the engine or disconnected from the second shaft.

4. In a tractor, the combination of a main frame, parallel cross beams extending between the sides of said main frame, an engine supported upon said cross beams, a bracket extending between said beams, a bracket secured upon one side of the main frame and having an offset arranged to overhang the side of the frame, bearings carried by the lower edges of said brackets, a shaft fitted in said bearings, a windlass carried by said shaft, operative connections between said windlass and the engine, a ratchet rigid with one end of the windlass, and a dog mounted in the said overhanging offset of the bracket on the side of the main frame and adapted to engage said ratchet.

5. In a tractor, the combination of a frame, an engine mounted thereon, a main shaft mounted upon the frame, a sleeve secured to said shaft and provided with an annular flange, a ring carried by said flange in spaced relation thereto, a drum rotatably mounted upon the shaft and extending around the flange and the ring secured to the same, a sprocket wheel fixed to the said drum, means whereby motion is imparted to said sprocket from the engine, a friction band disposed between the said flange and the said ring and housed within the drum, and means carried by the flange and the ring for causing the said band to engage the drum and thereby lock the same to the shaft.

6. In a tractor, the combination of a main frame, an engine mounted thereon, a main shaft mounted on the frame, operative connections between said shaft and the engine, operative connections between said shaft and a mechanism to be driven, each of said connections comprising a sprocket wheel, a drum loosely mounted on the shaft and to which said sprocket wheel is secured, a sleeve secured to the shaft, a flange on said sleeve, a friction band disposed in the drum and supported adjacent the inner periphery thereof by the said flange, a tapered collar slidably mounted on said sleeve, a rock shaft journaled in the said flange and connected with the ends of said friction band, and a lever carried by said shaft and disposed radially thereof and arranged to be actuated by said tapered collar.

7. In a tractor, the combination of a frame, an engine mounted upon the forward portion of the frame, a pair of driving wheels mounted in the rear end of the frame, a main shaft mounted on the frame adjacent the engine, operative connections between said shaft and the engine, a differential shaft, operative connections between the said shaft and the main shaft, sprocket wheels connected with the inner ends of the driving wheels, and operative connections between the said sprocket wheels and the differential shaft.

8. In a tractor, the combination of a frame, an axle secured rigidly therein, heads mounted for rotation upon said axle, means for rotating and controlling the rotation of said heads, cylindrical shells secured to the outer ends of said heads, and treads secured to the said shells and disposed in two series, the treads of each series being parallel and disposed obliquely relative to the shells and the adjacent ends of the treads in the two series overlapping.

9. In a tractor, the combination of a frame, driving wheels mounted in the rear portion of said frame, a power shaft mounted on the frame, a rock shaft mounted on the frame between the power shaft and the driving wheels brake drums connected rigidly with the outer ends of the driving wheels, brake bands encircling said brake drums, connections between the rock shaft and the brake bands, and connections between the rock shaft and the power shaft whereby upon oscillation of the rock shaft the power shaft will be rendered inoperative and the brake bands will be caused to bind upon the said brake drums.

10. In a tractor, the combination of a substantially U-shaped integral main frame, a cross beam extending between the sides of the main frame, longitudinal beams secured to said cross beam and extending therefrom to the rear end of the main frame, and a coupling body rigidly connecting the rear ends of said beams to the rear end of the main frame.

11. In a tractor, the combination of a U-shaped main frame, a cross beam extending between the sides of the main frame, longitudinal beams extending between the rear end of the main frame and the said cross beam, and a bracket secured to said longitudinal beams and said cross beam and forming a connection between the same and having upwardly projecting arms arranged to support a shaft.

12. In a tractor, the combination of a main frame, a cross beam extending between the side bars of the main frame, longitudinal beams extending between said cross beam and the rear end of the main frame and having their inner opposed faces channeled, a bracket fitting between said beams and having an upper expanded portion bearing against the opposed channeled faces of said beams, securing bolts inserted through said beams and said expanded portion of the bracket, loops formed upon the lower portion of said bracket below the said longitudinal beams, brackets secured to the side bars of the main frame in alinement with the first-mentioned bracket and provided with hangers alined with the loops of said first-mentioned bracket, an axle secured rigidly in said hangers and the loops on the first-mentioned bracket, and driving wheels rotatably mounted upon said axle.

13. In a tractor, the combination of a main frame, a cross beam extending between the sides of the main frame, longitudinal beams extending between said cross beam and the rear end of the main frame, a bracket connecting the rear ends of said longitudinal beams with the rear end of the main frame, a bracket resting upon said cross beam and said longitudinal beams and having a portion depending between the said longitudinal beams and provided with a bearing below said beams, said bracket being secured to the longitudinal beams and the cross beam to form a connection between the same, and forwardly projecting arms on the front side of said bracket arranged to support a shaft.

14. In a tractor, the combination of a main frame, a cross beam extending between the sides of the main frame, longitudinal beams extending between said cross beam and the rear end of the main frame, a bracket resting upon said cross beam and said longitudinal beams and having a portion depending between the said longitudinal beams and provided with a bearing below the same, said bracket being secured to the longitudinal beams and the cross beam to form a connection between the same, and forwardly projecting arms on the front side of said bracket arranged to support a shaft.

15. In a tractor, the combination of a main frame, cross beams extending between the side bars of the main frame, and angle brackets fitted to the said side bars and some of said cross beams and secured to the same and having portions depending below the frame and provided with transverse openings.

16. In a tractor, the combination of a substantially U-shaped main frame, cross beams extending between the side bars of the main frame, intermediate cross beams disposed in alinement with each other and having their outer ends secured to the side bars of the main frame, and a bracket connecting the inner ends of said alined intermediate cross beams and having a portion extending forwardly and connected to the forward cross beam, said forwardly extending portion of the bracket having a depending shaft-carrying portion.

17. In a tractor, the combination of a main frame, cross beams secured to and extending between the side bars of the main frame, intermediate cross beams disposed in alinement with each other, a bracket connecting the inner ends of said intermediate cross beams and having a portion extending forwardly to the foremost cross beam and secured to the same and also having a rearwardly extending portion, and a connection between said rearwardly extending portion and the rearmost cross beam, the said bracket being provided with an upstanding portion between the beams connected by it and provided with guides for power-transmitting elements.

18. In a tractor, the combination of a main frame, brackets secured thereto and having depending hanger portions provided with notches having open lower ends, bearing sleeves constructed to fit within said notches and having grooves in their upper sides to engage the upper walls of said notches, and latches mounted upon said hangers to extend across the notches and retain the said bearing sleeves therein.

19. In a tractor, the combination of a main frame, brackets secured thereto and having depending hanger portions provided with notches therein and also provided with implement receiving openings near their rear ends, bearings adapted to fit within the said notches, and means for retaining the bearings in the notches.

20. In a tractor, the combination of a frame, brackets secured thereto and having depending hanger portions provided with notches having open lower ends, bearing members fitted in said notches and having grooves in their upper sides to engage the upper end walls of said notches, and latches extending across the notches below said bearing members and secured in seats upon the sides of said hanger members.

21. In a tractor, the combination of a main shaft having a keyway therein, a clamping sleeve fitted about said shaft and having a key adapted to engage in said keyway, and means for clamping said sleeve about said main shaft and a stub shaft.

22. In a tractor, the combination of a frame, an engine mounted transversely thereon, a water jacket inclosing said engine, a radiator disposed in front of the engine and at one side of the same, and connections between the radiator and the water jacket of the engine.

23. In a tractor, the combination of a frame, an engine mounted transversely thereon, a radiator mounted transversely of the frame in advance of the engine, a supporting bar secured upon the front side of the radiator, a fan mounted upon said bar in advance of the radiator, and means whereby said fan may be driven from the engine.

24. In a tractor, the combination of a U-shaped channeled main frame, a circular frame secured between the front ends of said main frame, cross beams within the main frame in the forward portion thereof, longitudinal beams extending between the rearmost cross beam and the rear end of the main frame, brackets rigidly connecting the ends of the cross beams and the sides of the main frame, a bracket rigidly connecting the longitudinal beams and the rearmost cross beam, and a bracket rigidly connecting the longitudinal beams and the rear end of the main frame, said brackets being constructed to conform to the parts against which they fit.

25. In a tractor, the combination of a frame, transversely alined hangers thereon each having a notch opening through its lower edge, bearings fitted in said notches, a shaft mounted in said bearings and extending across the frame and means for retaining the bearings in the notches.

26. In a tractor, the combination of a main frame, longitudinal beams disposed medially in the main frame and extending to the rear end thereof, and a coupling bracket secured to the rear end of the main frame and between the rear ends of the longitudinal beams to form a connection between the same, said bracket having coupling jaws projecting over the rear end of the main frame.

27. In a tractor, the combination of a channeled main frame, longitudinal beams disposed within the main frame and extending to the rear end thereof, and a bracket resting on the rear end of the main frame and having a depending portion fitting in the channel of the main frame and between the rear ends of the longitudinal beams, said bracket being secured to said beams and the rear end of the main frame to form a connection between the same.

28. In a tractor, the combination of a channeled main frame, brackets having offset portions fitting closely to the frame and secured rigidly thereon and having portions depending below the same, and an axle extending through said depending portions of the brackets and secured rigidly therein to form a transverse tie for the frame.

29. In a tractor, the combination of a frame, an axle secured rigidly at and intermediate its ends to the frame to form a transverse tie for the same, and driving wheels rotatably mounted on said axle between the inner and outer rigid fastenings.

30. In a tractor, a U-shaped main frame having forwardly converging portions at the front ends of its sides, a circular frame secured rigidly to and between the front extremities of said converging portions, and an axle secured rigidly to the sides of the frame near the rear end thereof and extending entirely across the same to form a tie therefor.

31. In a tractor, a U-shaped main frame having the front ends of its side bars forwardly converging, a circular frame secured rigidly to and between the said forwardly converging ends, a plurality of cross beams secured to and between the sides of the main frame, a longitudinal beam extending between the rearmost cross beam and the rear end of the main frame, and an axle secured rigidly to the said longitudinal beam and the sides of the main frame.

32. In a tractor, the combination of a main frame, an axle secured rigidly in the main frame, and a driving wheel mounted on said axle for rotation about the same and for oscillation in the axial plane thereof toward and from the medial longitudinal line of the frame.

33. In a tractor, the combination of a main frame, a plurality of brackets secured on the frame and having bearing portions depending below the frame, tractor operating members all carried by said bearing portions below the frame, a motor mounted on the frame, and connections between the motor and said operating members.

34. A tractor comprising a U-shaped main frame having the front ends of its side bars converging, a circular frame secured to and between said front ends, a steering-wheel carrier mounted in said circular frame for rotation in the plane of the same, an axle secured rigidly in the frame near the rear end thereof, driving wheels mounted for independent rotation on said axle, an engine mounted on the frame near the front end thereof, a main shaft mounted on the frame between the engine and the driving wheels, operating connections between the engine and said shaft, and operating connections between the said shaft and the driving wheels.

35. In a tractor, the combination of a main frame, a transverse series of longitudinally extending hangers thereon, said hangers being provided with notches opening through their lower ends, a shaft having power-transmitting devices mounted thereon and passing through said notches, and means for retaining the shaft in said notches and permitting the removal of the same with the parts assembled thereon through the open lower ends of the notches.

36. In a tractor, the combination of a main frame, bearings mounted therein for limited oscillatory movement but held against longitudinal movement, and a shaft carried by said bearings.

37. In a tractor, the combination of meeting channeled frame members, and brackets secured rigidly to said frame members and having offsets fitting within the channels of one of the frame members.

38. In a tractor, the combination of intersecting channeled frame members, and a bracket having a main body portion fitting within and secured to the channeled portion of one of said frame members and provided at its end with a wing fitting in and secured to the channeled portion of the intersecting frame member, said wing having an external shoulder against which the end of said intersecting frame member abuts.

39. A tractor comprising a frame, an engine mounted transversely on the frame, transmission gearing connected with the inner end of the engine, a starter connected with the inner end of the engine, and an operator's seat on the frame near the said transmission gearing and starter.

In testimony whereof I affix my signature.

OLIVER W. JOHNSON. [L. S.]